(12) United States Patent
Ruggiero (10) Patent No.: US 10,749,321 B1
(45) Date of Patent: Aug. 18, 2020

(54) KNEE SAVER HARNESS WIRED JUNCTION BOX

(71) Applicant: Alexander Ruggiero, Millsboro, DE (US)

(72) Inventor: Alexander Ruggiero, Millsboro, DE (US)

(*) Notice: Subject to any disclaimer, the term of this patent is extended or adjusted under 35 U.S.C. 154(b) by 0 days.

(21) Appl. No.: 16/214,239

(22) Filed: Dec. 10, 2018

Related U.S. Application Data (63) Continuation-in-part of application No. 15/905,687, filed on Feb. 26, 2018, now Pat. No. 10,320,169.

(51) Int. Cl.
*H02G 3/08* (2006.01)
*H02G 3/16* (2006.01)
*H02G 3/18* (2006.01)
*H03J 3/00* (2006.01)

(52) U.S. Cl.
CPC ............. *H02G 3/086* (2013.01); *H02G 3/081* (2013.01); *H02G 3/18* (2013.01)

(58) Field of Classification Search
CPC ............ H02G 3/083; H02G 3/16; H02G 3/18; H02G 3/08; H02G 3/0406; H02G 3/085; H02G 3/123; H02G 3/14; H02G 3/086; H02G 3/125; H03J 3/00
USPC .................................................. 174/549, 535
See application file for complete search history.

(56) References Cited

U.S. PATENT DOCUMENTS

| | | | | |
|---|---|---|---|---|
| 3,569,911 A * | 3/1971 | Bogdanowicz | ......... | F21V 23/00 439/441 |
| 4,302,624 A * | 11/1981 | Newman | ............... | H01R 13/447 174/67 |
| 4,715,507 A * | 12/1987 | Chamberlin | ........... | H02G 3/123 174/53 |
| 4,967,990 A * | 11/1990 | Rinderer | ................ | H02G 3/125 220/3.9 |
| 6,170,685 B1 * | 1/2001 | Currier | .................. | H02G 3/121 220/3.2 |
| 8,835,763 B1 * | 9/2014 | Hammond | ............... | H02G 3/12 174/66 |
| 9,368,948 B2 * | 6/2016 | Ruggiero | ............... | H02G 3/086 |
| 9,595,819 B1 * | 3/2017 | Bonino | .................. | H02G 3/088 |
| 9,979,169 B1 * | 5/2018 | Wronski | ................ | H02G 3/081 |
| D871,347 S * | 12/2019 | Fioriello | ..................... | D13/152 |
| 10,530,141 B1 * | 1/2020 | Fioriello | ............. | H02G 3/0406 |

(Continued)

OTHER PUBLICATIONS

Rough in Electrical _ Covers SnnartGuard_p. 1_Jul. 4, 2017.*
U.S. Appl. No. 16/157,616 Application PDF.*
Rough in Electrical Covers_SmartGuard_p. 1_Jul. 4, 2017.*

*Primary Examiner* — Timothy J Thompson
*Assistant Examiner* — Guillermo J Egoavil (57) ABSTRACT

THE KNEE SAVER HARNESS WIRED JUNCTION BOX comprises a wiring harness and an enclosure. It provides a work surface to measure, cut, and remove some sheathing from electrical cables, in preparation to install those cables to electrical receptacles and/or switches. The prepared wires are then connected to a HUB and termination devices, forming a wiring harness, outside of an enclosure. This wiring harness is now inserted into an installed electrical PVC or metal box, while the installer is standing up, and on the first day of the installation process. The core termination device and enclosure, can handle more than one power source, with different amperages, at the same time.

2 Claims, 7 Drawing Sheets

(56) References Cited

U.S. PATENT DOCUMENTS

| | | | | |
|---|---|---|---|---|
| 2002/0185296 | A1* | 12/2002 | Schultz | H01R 27/00 |
| | | | | 174/53 |
| 2013/0130537 | A1* | 5/2013 | Keswani | H01R 24/78 |
| | | | | 439/355 |
| 2014/0054286 | A1* | 2/2014 | Kummer | H02G 3/12 |
| | | | | 220/3.9 |
| 2015/0096875 | A1* | 4/2015 | Ruggiero | H02G 3/086 |
| | | | | 200/297 |
| 2016/0360629 | A1* | 12/2016 | Witherbee | H02G 3/125 |

* cited by examiner

KNEE SAVER HARNESS WIRED JUNCTION BOX

BACKGROUND OF THE INVENTION

1. Field of the Invention

The present invention relates to systems and devices for the interconnection of wires to switches and receptacles within junction boxes. More particularly, the present invention relates to the installation process of the wire connection system and the manner in which it connects wires to a receptacle or switch, within the confines of a junction box.

2. Prior Art Description

While there have been many patents issued on receptacles and switches, most are not used for various reasons. Some are too expensive to make, while others do not save any installation time and are not cost effective. Some even look great on paper, but would never pass a building's electrical inspection. There is an electrical code that changes every year, in an attempt to make the use of electrical power, safer.

In order to have a clearer understanding of the need for having the present invention, one must understand the workings of the Knee Saver electrical box and the Time Saver electrical switch. A physical comparison of them to prior art's wiring connections of a receptacle and a switch are described below.

Most building codes require that all connections between wires, switches, receptacles and/or any other hard wired components be contained within some form of fire retardant junction box. Traditionally, such junction boxes are made of metal or polyvinylchloride (PVC).

During the rough construction phase, the junction boxes are mounted within various walls of the building. The wires are then run between the junction boxes. Depending upon the circuit design being installed by an electrician, it is common for various wires to be directly interconnected within a junction box. Such wire-to-wire connections are traditionally made using wire nuts. To make such a connection, wires are twisted together in front of a junction box. The twisted wires are capped with a wire nut. The wire nut and the wires are then bent back into the confines of the junction box.

In the initial visit by the electrician, he/she will install all the electrical cables going to all the junction boxes. Once all the wires are in the boxes, the electrician connects only the ground wires, for both receptacles and switches. The electrician stops work and waits for an electrical inspection. If receptacles and switches were installed, the bunch of wires in the box would make it impossible to determine if the ground and other wires were installed properly.

Only after an approval by an electrical inspector, can an electrician continue with the installation. In the second trip to the work site, he/she can install the receptacles, switches, and lights.

With the exception of a few specialty receptacles, most commonly used prior art receptacles are installed in the following manner.

The receptacle is installed about 16 inches from the floor. The electrician has to bend and remain on his/her knees, until all of the following procedures are completed.

A standard sheathed cable contains a black, a white, and a bare wire. Some cabled wires come in different thicknesses or gauges. Only wires of the same gauge can be joined together. At least one sheathed cable goes from box to box, supplying power and electrical continuity. However, there can and usually are, other cables that go into that same junction box. An additional cable may bring electricity to a receptacle in a different direction or may be for a specialty receptacle. Another cable may be for a switch, a light, or for any number of reasons. Usually only four cables can go safely into a one gang box. When the casing of a sheathed cable is removed, you have three wires sticking out. If there are three cables, there are nine wires, etc.

The standard receptacle has two screws on either side of it. One side gets the black wires attached to the brass screws, while the white wires get attached to the silver screws, on the other side. There are locations in the back of the receptacle, to push wires into, rather than attach the wires to the side screws. The receptacle, which may have wires wrapped around the screws on its sides, and have some wires inserted in its back, is then pushed inside the junction box.

However, as the wires are manipulated back into the junction box, sometimes the wires separate under the wire nut and the connection fails. An electrician must then inspect all the connections in the circuit to discover where the break has occurred.

To complicate matters, wire connections often cannot be readily observed within the confines of a junction box. Wires connected to a receptacle or a switch is blocked from view behind the receptacle or switch.

Likewise, wires connected together with a wire nut, behind a switch or a receptacle is also blocked from view. These connections often become loose and are impossible to determine. The wire nuts have to be removed and retightened. The receptacle has to be pulled out, but may or may not have to be reconnected. Another issue is only one ground wire can be connected to a ground screw on a receptacle. A separate ground wire has to go from the receptacle to a bundle of ground wires fastened with a wire nut. An un-viewable ground connection is one of the major reasons why the work stops, and an inspection is made.

After the wire nut connections are pushed inside the box, the receptacle is used to push the wires back further. This pushing process is what sometimes causes other connections to fail.

If wires get inserted into the back of the receptacle, the screws on the sides still get energized, whether there are wires connected to the side screws or not, which is a safety concern.

When looking at an installed receptacle, in a finished wall with the cover plate off, you can see wires connected to the side screws, but that's it.
You CANNOT distinguish:
  What are incoming and outgoing lines?
  Are the ground wires connected?
  Is each receptacle grounded?
  Are the wires long enough to change a receptacle later on, if needed?
  How many wires are going into the box?
The lists of questions go on and on.

When painting the walls, the wires in the box often get painted too, adding to the confusion. The present invention addresses those concerns. First, it stacks like colored wires. You'll be able to see all the black wires in one vertical stack. Similarly, the white wires and the green or bare ground wires, have their own distinct stack. Since red wires are also power lines, they go with the black wires. Looking at the rear portion, or HUB, will tell you if all the wires are where they are supposed to be, using the "like color stacking system". The present invention encourages the installer to install the termination device in the roughing process. Therefore, all termination devices will be available with a cover on the face of the termination device, for protection from paint and construction debris. (FIG. 12)

Switches are wired differently. Their construction is also different. For one thing, they have two screws, not four like the receptacle, and both screws are on the same side. Wires can also be inserted into its rear. An electrician has to install a small black wire from switch to switch for power. All the white wires get connected to each other by use of a wire nut; there is no other location on the switch, to connect any white wires to. The ground wires are connected in the same manner as previously explained. A black wire from each new cable has to go to the top brass screw on a switch. The white wire gets connected to the other white wires in the box. The other end of that cable gets its black wire and white wire attached directly to a fixture's black and white wires. The other screw, on the bottom of the switch, gets attached to another black wire directly from a power source or power from another switch.

Note, during the roughing process, while preparing to install wires for a switch, the walls are open and you can see which line will control what device. (the switch is not installed at this point)

Most building installations contain several locations, within that building, with three or four switches in a gang of junction boxes. If you want four switches, you need one cable from a power source, and four cables going to fixtures, for a total of five cables. All five ground wires are twisted together, along with another separate short ground wire, capped with a wire nut and pushed to the back of the box. Later, additional short ground wires (one from each switch) gets attached to that short ground wire mentioned above, thereby grounding all switches. The black wire from a power source gets pushed into the back of the first switch near the bottom screw. Three other small black wires go from switch to switch supplying power to each switch. Usually, after the electrical inspection is made, but before the electrician returns, (which also may or may not be the same electrician), the insulation and/or wall boards are installed.

The electrician can't see and doesn't know what line will control what device. That is why it is very important to mark the wire "sheathing" beforehand. Otherwise, a lot of time will be spent trying to figure that out and having to go back and forth to the service panel, that contains the circuit breakers.

After a complete installation, an electrician may have installed the first switch to control an overhead light. A second switch to control a fan and a third switch to control a receptacle for a lamp. If there was a miscommunication, and the owner wants the order of the switches to be different, it can be difficult in an already closed wall. Wires have to be disconnected and reconnected or the switches physically have to be moved.

U.S. Pat. No. 9,368,948 TIME SAVER ELECTRICAL SWITCH, (described below) simplifies the installation process by attaching all wires to the first switch. All other connections, between switches, are made modularly to each other.

There is a wire cable(S8) deposed near the top of the Time Saver Electrical Switch, (FIG. 11). It provides electrical power and continuity from a power source, to that switch. The power remains at this connection point until the user control element (S6a) is turned to the ON position. When the switch is turned on, the power goes to a plate (S1, not shown) with four movable contacts (S2) going through it. The four contacts become energized. These contacts are recessed for safety and can be seen on the front surface of the switch assembly. There are four (horizontal) parallel electrical conductors (not shown) in the back of the switch. When a contact is seated, it makes contact with one of these conductors and power is sent back through to the rear of first switch. Each of these parallel conductors is independent of each other, and transfers power (internally) out of the first switch through the side connected ports. Cables (S28) attached to those ports, send power to fixtures or devices. The ground bar and screws (S9 & S10) are shown with switch to switch connectors (S15,S19,S13,S16).

The UNIVERSAL ELECTRICAL BOX, U.S. Pat. No. 9,960,580 (FIG. 5 &FIG. 6) is an assembly that simplifies the wiring of switches, receptacles and other such termination devices within a junction box. It utilizes a dielectric body (M8) having a front surface (#64) and a side surface (26). A plurality of side connector ports (#32, for white wires and #34 for black wires) are disposed on the side surface of the dielectric body. These side connector ports connect to wires that enter and leave the junction box(#14 & #12). A termination device(#70) is present at the front surface of the dielectric body. The termination device may be manufactured as part of the dielectric body (#38) or may be a removable plug-in unit. The termination device is a receptacle, switch, or similar device.

Figure 5:
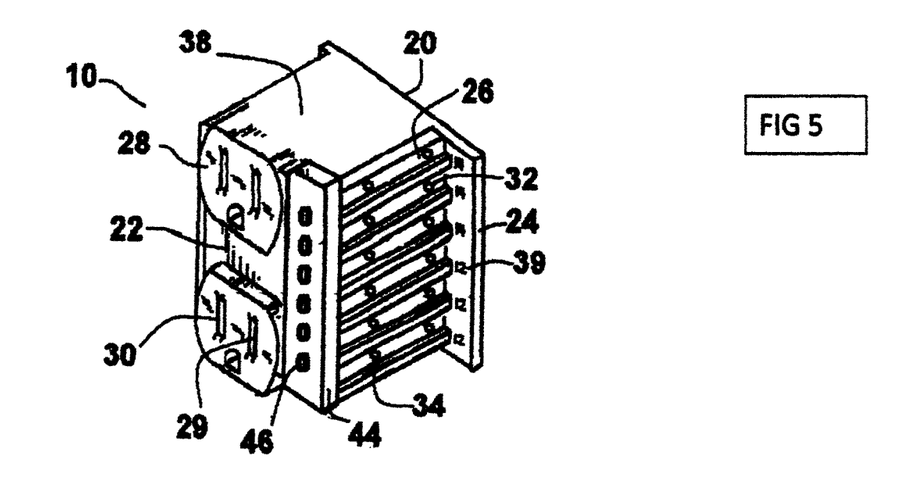
FIG. 5 is a perspective view of the one-piece termination/Hub device, used with the present invention.
Figure 6:
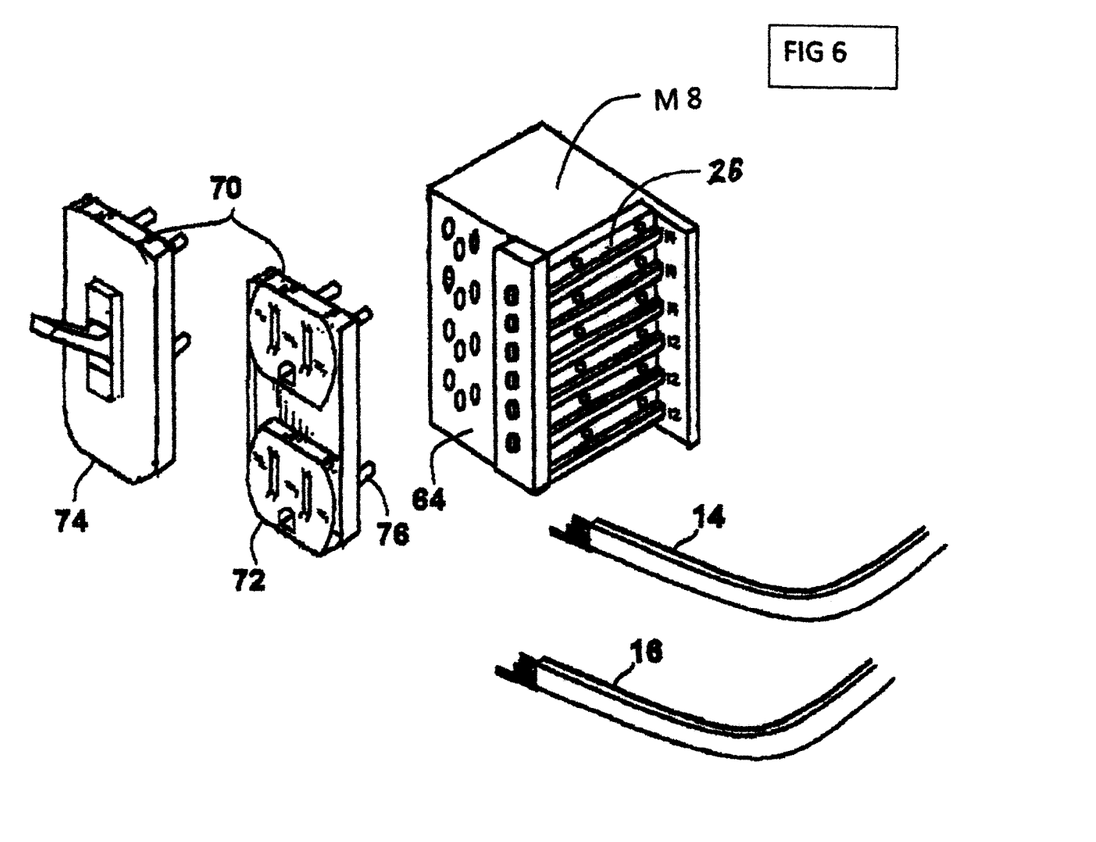
FIG. 6 is a perspective view of the two piece Termination and Hub device, used with the present invention.
Figure 7:
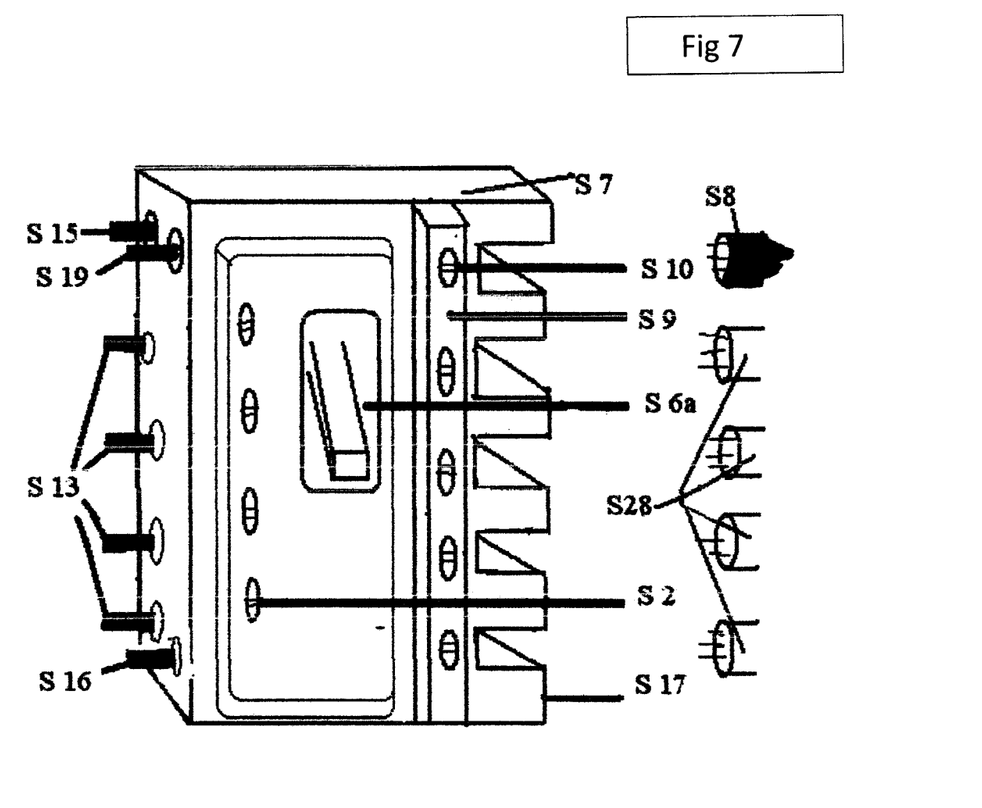
FIG. 7 is a perspective view of Time Saver Electrical Switch.
Figure 8:
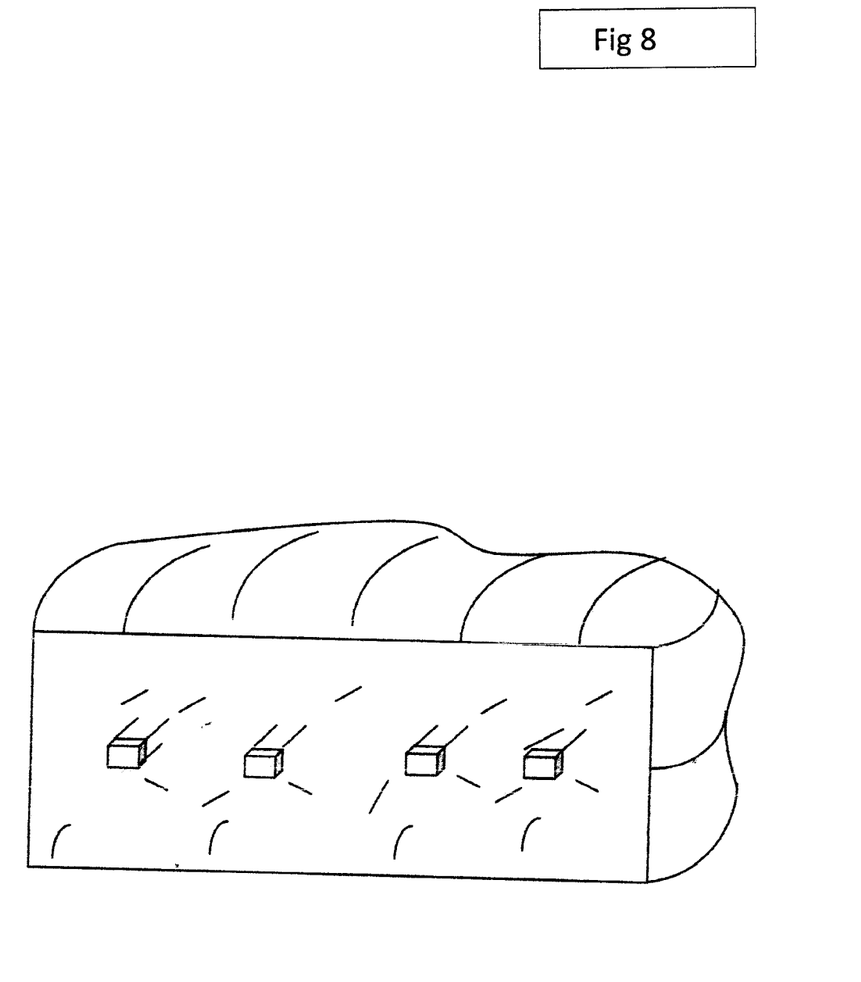
FIG. 8 is a perspective view of a paint and dust shield

A plurality of conductive elements extends through the dielectric body and connects the termination device to the side connector ports. As such, electrical power is provided to the termination device through the side connector ports and the conductive elements that pass through the dielectric body.

The uniqueness of having the same HUB used for any type of termination device, within an enclosure, creates a base for new possibilities. This application is a continue-in-part application because the same HUB is used for making and installing a new wiring harness, prepared outside of the enclosure, and inserted into an enclosure.

Today, if you have one or several prior art switches, positioned side by side, each fixture, light, or fan, for example, has to be directly attached or "hard wired" to an individual switch. Prior to a change in the Electrical Code, the neutral (white) wire was sometimes used as a black power line and painted black to indicate same. With the cover plate OFF, and the power ON, it remains a shock hazard. Work has to stop in order for an electrical inspector to observe; proper installation of all parts, and more importantly, to observe that the grounding connections are done properly. If prior art receptacles and switches were installed at this time, an inspector could not see the grounding connections, or any of the other connections.

In U.S. Pat. No. 6,220,897 to Albert David Maxwell, as with other referenced prior art, is designed for a specific purpose. It is not used as a standard use receptacle in business buildings or homes. Maxwell does not use wire nuts because there are no other wires allowed to enter the junction box. Maxwell's box will not work for switches; the white wires have to be connected to each other, somewhere.

Maxwell's plug-out plug-in system, does not offer more options or benefits, using electrical ports. In Maxwell's drawings, the electrical power to his device is attached THROUGH the outside of his box, for the side and top connections, a huge difference. A loose wire would now be exposed to the inside elements of the wall cavity, wall board and insulation. The dielectric body, of the present invention, not only makes all wires visible inside the box, which his does not, but should a wire become loose, it is safely inside the HUB, and would need to coma out completely to come in contact with any conductive surface, AND the only conductive surface exposed, is a GROUND. There are no combustible surfaces exposed. Maxwell has three connecting prongs much like an extension cord. The dielectric body used with present invention, in one model, is designed to accept any combination of 16 possible prongs, depending on purpose. Maxwell's design cannot handle more than one cable going in, and one cable going out, and does not have a grounding bar, just interlocking ground connections. Maxwell's limitations make it impractical as a standard use receptacle. Maxwell's device is an extension cord, with a circuit breaker used for computers, and placed inside a wall. It is comparable to U.S. Pat. No. 5,844,763 to Grace.

In U.S. Pat. No. 7,628,643 to Chrestos T. Pyrros entitled, Modular Electrical Receptacle, the first line of the abstract shows the first difference between it and the present receptacle invention. "A modular electrical receptacle configured so that more than one of the modular electrical receptacles can be connected to form a larger receptacle connected to a "single source of power". Our dielectric body can have three power sources, at the same time. One for switches, one for the #14 power line and one for the #12 power line. Unlike Pyrros's receptacle, our dielectric body, allows the first termination device to determine if it will be #14 or a #12 wire circuit. That determination is made by the prong locations, on the posterior surface of the termination device. If the prongs are on the top half of the posterior surface of the termination device, it will be a #14 wire circuit. Prongs on the lower half of the posterior surface will become a #12 wire circuit. The #14 wires, from cables are connected to the top portion of the dielectric body. The #12 wires, from cables are connected to the bottom portion of the dielectric body. "TRE SELECTED PRONGS have to line up with the SELECTED WIRES or it WILL NOT NORK."

The uniqueness of Pyrros's invention is in its ability to have receptacles on both sides of the same WALL, using the same power line. Pyrro referenced U.S. Pat. No. 5,203,712 to Kilpatrick, April 1993 entitled, Circuit Wiring Device. It contains side by side modulated receptacles, which makes Pyrro's side by side receptacles nothing new.

U.S. Pat. No. 5,619,013 to Jorgensen, April 1997 entitled Gangable Electrical Box, has removable doors. Jorgensen's patent is being considered due to the fact that the present receptacle and switch inventions have a removable cover. Jorgensen's idea is a method to add additional boxes or gangs for multiple switches or receptacles. It uses two screws to fasten the door in place. U.S. Pat. No. 1,296,811 to Keller, entitled Switch Box, March 1919, contains a lug (a bent metal piece) and one screw to hold the door in place. Keller had the idea of adding additional boxes or gangs for switches and receptacles in 1919.

However, the present invention's removable cover is not used to add additional boxes. It is to allow the full view of all the wiring connections and the ability to slide the prewired receptacles or switches into the junction box.

Over the years, many devices have been invented in an attempt to simplify the wiring of difficult types of electrical termination devices. However, these prior art devices are typically application specific, and can only be used as EITHER a switch box or a receptacle box. Prior art devices that show modular connections are exemplified by U.S. Pat. No. 6,563,049 to Lindy Lawrence May, entitled Modular Electrical System, U.S. Pat. No. 7,762,838 to Gorman, entitled Safety Module Electrical Distribution, U.S. Pat. No. 8,649,133 to Benoit, Weeks, Savicki, entitled Plug Tail Systems. Some of these junction boxes eliminate the need for wire nuts. However, these junction boxes contain custom manufactured internal components. Thus, the junction boxes are more complex to use and more costly than traditional junction boxes.

However, in U.S. Pat. No. 8,613,624 to Alfredo Arenas, entitled Modular, Wiring system With Locking Elements, as with all the other referenced prior art patents, the wire terminations are at the rear of the junction box and are hidden from view. As such, the number of wires entering the box, the quality of the connections, and the paths of interconnections cannot be visually observed without disassembly and removal of the components within the junction box.

Prior art contains tools that install the actual electrical box or enclosure, to a precise height and/or depth, on a wall stud. U.S. Pat. No. 4,635,372 to Tande concerns itself with the thickness of the wall board. Its device adjusts the box so when a receptacle or switch is installed, it will match up with the wall board. Other prior art such as: U.S. Pat. Nos. 4,635,372, and 8,117,746, both to DiLorenzo, claim to be able to perform three tasks at one time. Those tasks include; installing an electrical box, installing the wiring, and installing a receptacle or switch. Its machine would also place the receptacle or switch at the proper depth to align it with an applicable wallboard thickness. There is no mention of how the wires would be hooked up to a receptacle or switch. One must conclude that a standard receptacle or switch used today would be used for their invention. DiLorenzo, Tande, and many others think the depth of a receptacle or switch and its association with the finished wall is the reason for the stoppage of work after the boxes and the wires that lead to those boxes are installed. In addition to checking for things like where on a joist a hole was made to put an electrical line thru, are all the lines properly fastened thru out the building, etc, Inspectors want to see if the ground wires are connected correctly. Unlike our dielectric body and electrical receptacles and switches which show all wires, at all times, their connections cannot be viewed if a standard receptacle or switch is installed, in an open or closed wall.

Many PVC boxes used today have lines on their sides. These lines are used to install the box at the required depth for the finished wall. Some PVC boxes have a front flange to set the box to the correct depth.

Unlike prior art, the present invention's wires are connected OUTSIDE OF THE JUNCTION BOX, after the electrical box is installed on the stud. The preparation board (M9) provides a work surface, to mark the proper locations to cut and strip wires. It provides an area to hold the dielectric body (M3) while the wires are installed to that dielectric body (M8). The fully wired dielectric body is now ready to be slid into the box. There is also very little chance of any wires becoming loose.

A need therefore exists for a simple and safer device, with an installation process which is less taxing on the body. This combination of parts and process helps the builder because it provides a more cost effective installation, and helps prevents Hip and knee injuries to the installer.

SUMMARY OF THE INVENTION

In contrast, to the prior art's described receptacle's structure and installation process above, is the structure and installation process of the present receptacle invention.

Figure 1:
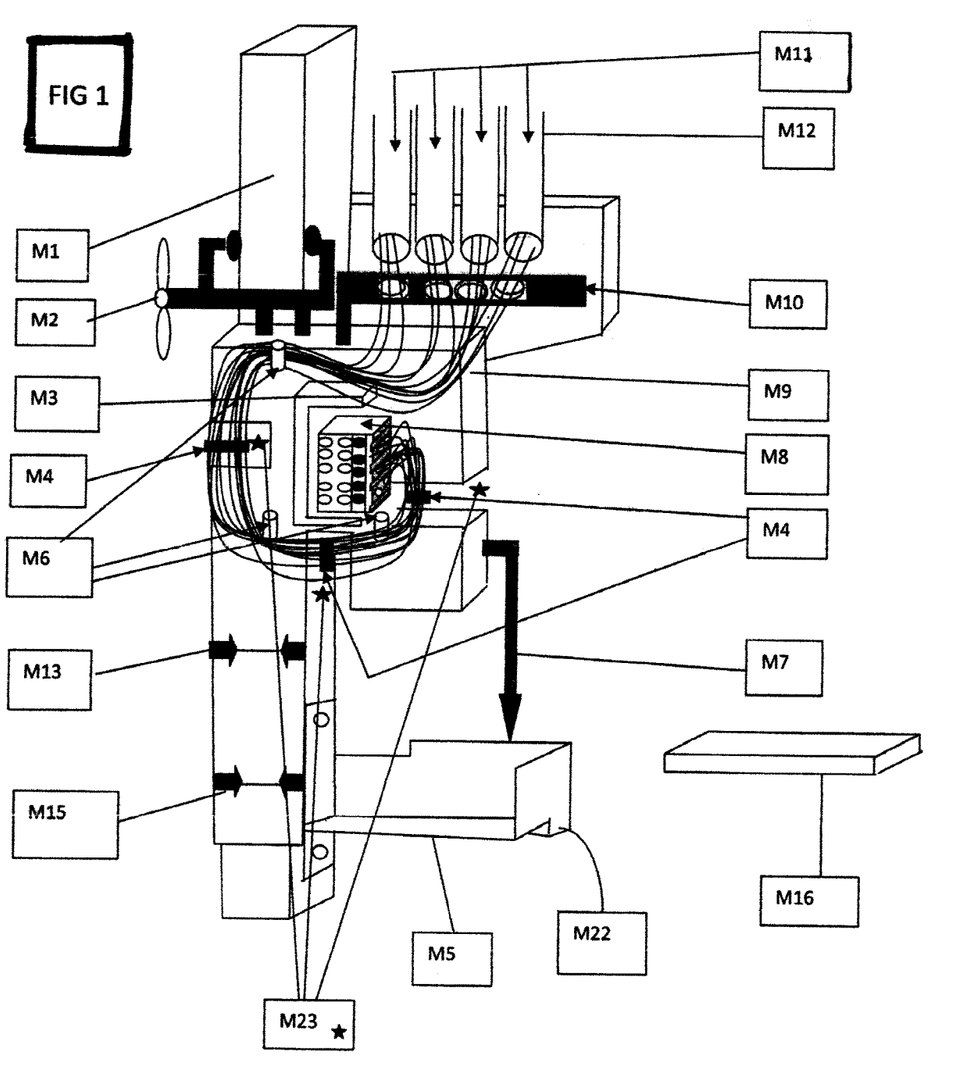
FIG. 1 is a detailed view illustrating the wiring harness that is created, using the present invention, outside of a junction box.

First and foremost is the ability to stand up while installing all the wires to a dielectric body, then sliding that fully wired dielectric body into the already fastened junction box on a wall stud (FIG. 2), in the electrician's first trip to the location, using the XNEE SAVER HARNESS WIRED JUNCTION BOX. (FIG. 1)

This device has features which give it its name.

First, the purpose. The ability to install one or more termination devices, while standing up, thereby reducing leg and hip injuries to installers.

SECOND, all components can fit inside a "standard Size" metal or PVC Box, according to code requirements.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Here's how it works.

The height adjustment rod(M7) hangs over and touches the top of the already installed receptacle box (M5). The clamp (M2) is now tightened to the wall stud(M1).

In FIG. 1's representation, the cables (M11) are lead down from the top of a wall stud. The cables AND wires are cut at the "cut cable mark" (M15) on the bottom of the "wire preparation board" (M9). The sheathing is removed at the "remove sheathing mark" (M13), for both plastic sheathing (ROHEX) and MEtal sheathing(BX) wire. About ⅜ of an inch, of the protective coating, is removed from the tips of each wire. The ⅜" bare wire tips will eventually be making a connection with A SET SCREW.

The combination of cut marks, give the cable and the wire, the exact length needed for a tight fit inside the junction box.

A small piece of electrical tape should be put at the end of the INCOMING black power lines, for identification purposes.

The ROMEX wire is lead thru and held by, the ROMEX connector on the ROMEX incoming bracket(M10). If the cable were BX, the BX wire is lead thru and is held by the BX connector on the BX incoming bracket (M10).

A dielectric body or HUB (M8) is inserted into The dielectric holder(M3). It is held there until each wire is pushed thru the HUB.

At this point, all cables are attached to a connector bracket with the wires hanging down, thru the bracket, and ⅜ wire coatings were removed from each wire.

Figure 3:
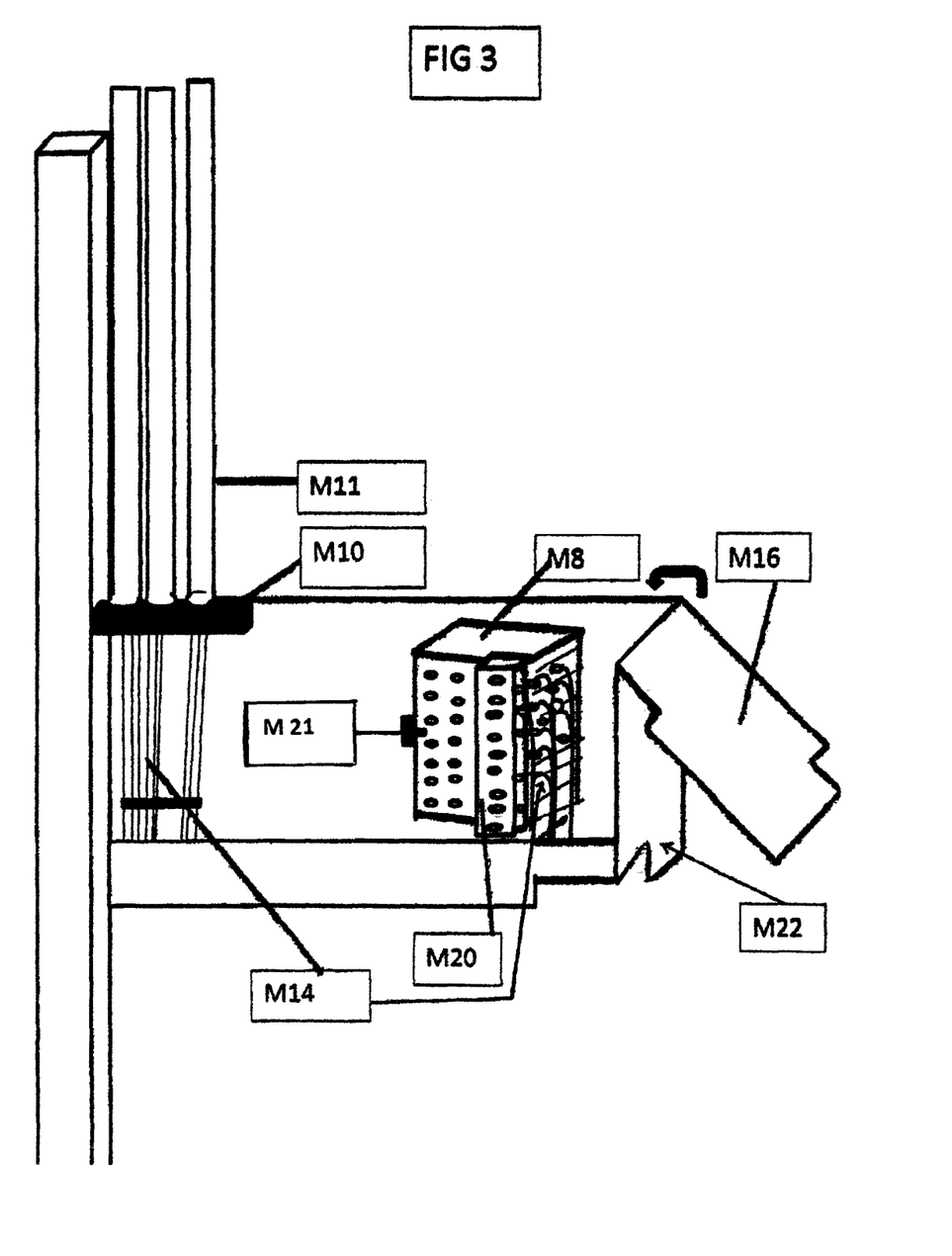
FIG. 3 is a perspective view of the wiring harness inserted into a specifically designed junction box, standing ready for installation of a termination device.

All wires should be guided AROUND the posts (M6) forming a WIRING HARNESS, made of multi-wire electrical conductors. (FIG. 3, M14).

All individual wires are then pushed thru the HUB, one at a time, until it stops. Once it stops, the set screw is tightened.

Each wire gets fastened INDIVIDUALLY.

You can install the wires in the HUB's side connectors, in any order, but the best modes are listed below.

For Switches: (using #14 wire) First, the power line to the top, then the rest. (Switches are usually #14 wire).

**For Receptacles: (using #14 wire) First, the three lines, then the power line last.

**For Receptacles: (using #12 wire) First, the power line, then the Rest.

Tighten the set screw after each wire insertion. The White wires are pushed, all the way in on the right column, on the side of the HUB, see FIG. 3. The Black wires are pushed, all the way in on the left column, on the side of the HUB.

Install all the ground wires to the ground bar(M20).

Wrap electrical tape (M4) around the wires at points (M23) on the "wire preparation board" (M9).

Once the wires are wrapped around the posts, taped, and all the wiring connections were made in the hub, you are ready for the installation process.

Grab the incoming wire bracket with one hand, and the hub with the other. Slide the entire harness off the wire preparation board, extend the cable, and slide (as one piece) it into the box, see FIG. 3. Make sure all the wires go into the designated wiring area (M22) in the bottom of the box and the hub gets locked into the hold & release snap (M21). Snap on the cover.

Leave the (FIG. 12) protective junction box, and/or termination device, dust and paint shield on.

FIG. 1 shows the cover (M16) for clarification purposes, unattached to the junction box.

However, FIG. 3 shows how they are permanently attached to the junction box.

Figure 2:
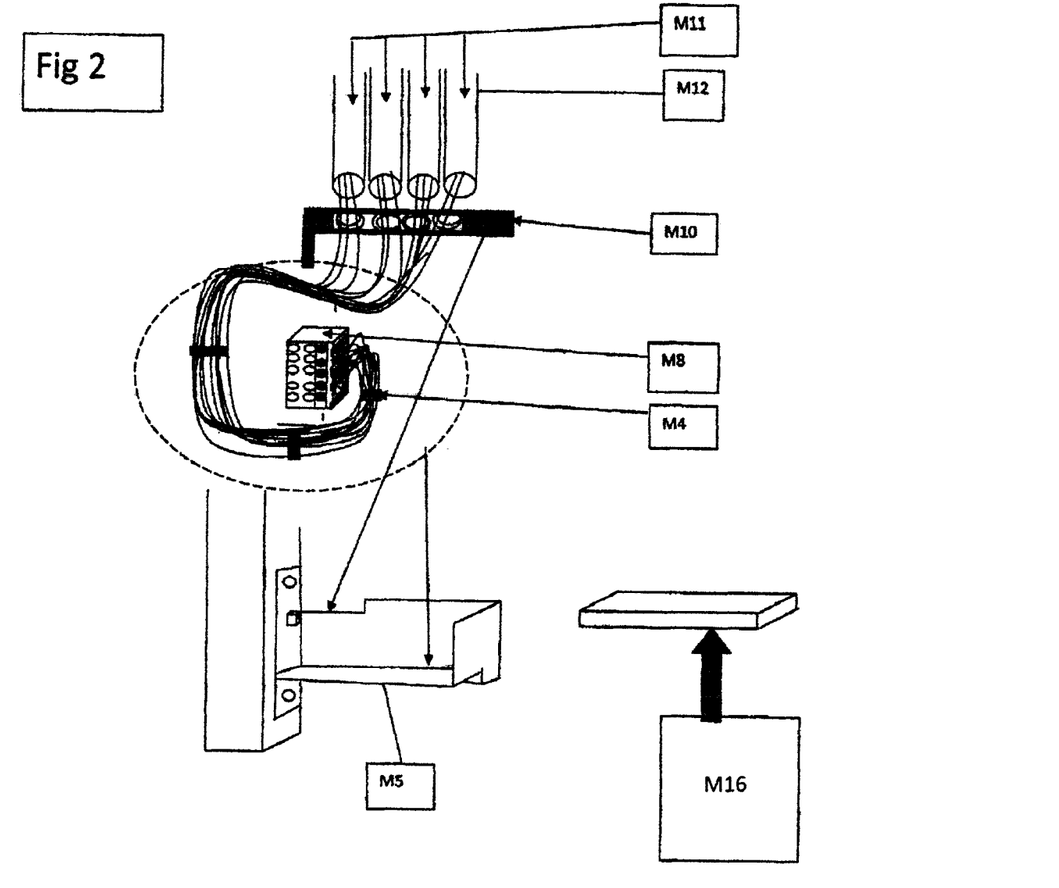
FIG. 2 is a perspective view of the components of the wiring Harness

FIG. 2 shows the basis of the wiring harness.

Loose wires (M14) are bound together(M4) and attached to a HUB(M8).

By constricting the wires into a non-flexing bundle or harness, usage of an enclosure space is optimized, and the risk of a short is decreased. Also, the need for someone to be at the same level of the junction box, is eliminated.

It should be understood that this is only one of many variations of wiring harnesses which can be used with the present invention.

FIG. 3 shows a completed harness installed in a junction box. The cables (M11) are shown going thru to the incoming wire bracket(M10). The wires(M14) drop down into the designated wiring area(M22) then go across the box. (Not Shown) The wires rise up and are attached to the dielectric body, as explained earlier. The dielectric body or RUB is held in place by the hold & release snap(M21), which also releases the hub should it need to be changed at a later date. As explained in Parent application Ser. No. 15/905,687, the HUB does not have to be removed in order to disconnect a line. simply, remove the set screw holding the proper line and use a non-conductive set screw to hold the wire in place, whereby there will be no transfer of power.

After the harness is installed, the top cover (M16) is closed.

Figure 4:
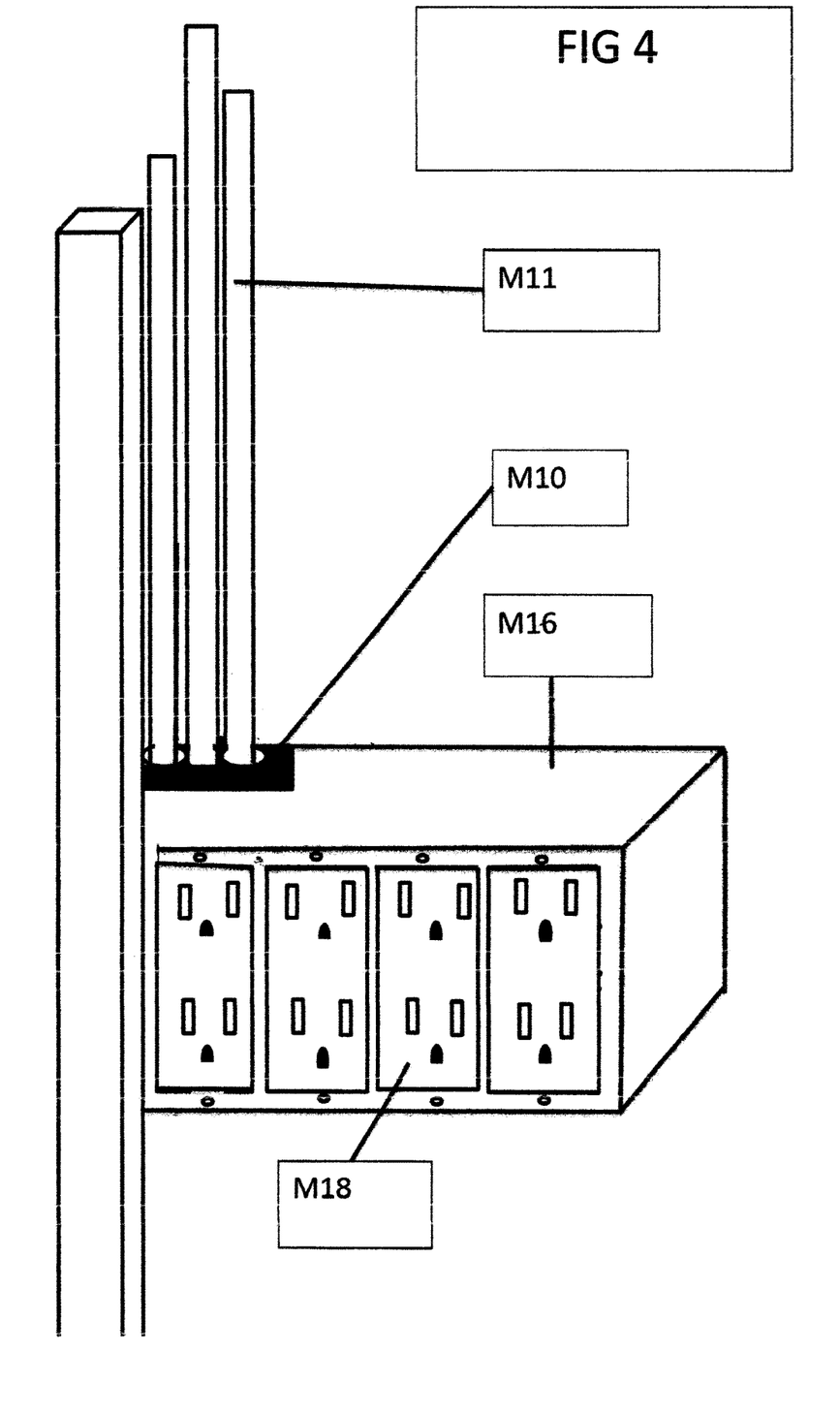
FIG. 4 is a perspective view of a termination device installed in a closed junction box, installed on a wall stud, ready for an electrical inspection or insulation and sheetrock.

FIG. 4 Shows all cables secured inside the junction box. The junction box, whether PVC or Metal, is secured to a stud and is closed on all sides, with the exception of the front. The PVC box may have a clear see-thru top.

FIG. 5 is a diagram of the UNIVERSAL ELECTRICAL BOX'S (U.S. Pat. No. 9,960,580) one piece device. All wires are connected to the BUB's side surface, with a termination device permanently attached to the front side. Number (39) shows the different available amperage lines.

The vertical ports, on the right side (M26) are the Neutral ports. The vertical ports, to the immediate left of the neutral ports, are the power ports(M34). On the far left side, is the ground bus (M44) for all the ground wires.

FIG. 6 is the UNIVERSAL ELECTRICAL BOX's two piece device. Any termination device (M70), which has prongs sticking out of the back, can be plugged into the HUB (M8). The layout of the prongs, control where it will pick up the current, and what line or lines it will transfer that current to.

Looking at the gauge (39) you can see the #14 wire ports are on the top and the #12 wire ports are on the bottom. A 15 amp (#14 wire) termination device has prongs on the top half of its device. If the #14 wires were installed in the HUB, the prongs of the 15 amp termination device would be on the same level, and match so the termination device would have power.

In this scenario, if a 20 amp termination device were plugged in, (the prongs are positioned on the bottom half of the device) it would not work. The #14 wire power line would be nowhere near the termination device's prongs. It wouldn't line up, no match, no current.

This design is to take "decision making" out of the Hands of the installer, or to use the term "Idiot Proof". One might think that if the wrong wire was used and the wrong terminal device was used, it would work. Not so. First, the Bigger #12 wire doesn't fit into the #14 slot in the HUB. Second, and most important, the walls are open (The present invention is for new construction or remodeling only) and anyone can see what color the sheathing is. White for #14 wire and yellow for #12 wire. In addition to having prongs at different locations on the termination device, on the surface of each device is printed its amperage rating.

It is common industry practice, since 2001, that Manufactures use the following color code on wire sheathing:

| White | #14 wire | 15 Amp |
| Yellow | #12 wire | 20 Amp |
| Orange | #10 wire | 30 Amp |
| Black | #6 wire | 45 Amp |
| Black | #8 wire | 45 Amp |
| Gray | | Underground |

The #14 wire and the #12 wire are represented by 15 amp and 20 amp respectively.

FIG. (11) is a diagram of the one-piece Time Saver Electrical Switch, U.S. Pat. No. 9,368,948. How it works is described in the background, but what is significant here is that all wires are attached to the first switch.

Prongs: S1S,S19,S13,S16 are used to add more switches, modularly. Four individual switches, can be used with the present invention.

Now the ability exists, to see all the wires, allowing the inspector to see the connections while the receptacle is already installed (FIG. 4). The cover and/or viewing door can be opened for viewing.

It has the ability to handle different gauged wires at the same time (FIG. 5)

This invention model can handle up to nine cables.

You can also put your hand in the box, while the circuit is energized at any time after installation, because there are no exposed energized wires or screws.

The wires are all in columns, so the color of the plastic protective coating on the wires, (black, white, red, or green) for example would make it obvious if a wire were installed in the wrong location. There is no need to insert wires in the rear of the receptacle, there is plenty of space to install wires on the side surface.

All ground wires are neatly attached to a ground bus element(M20), not bunched up with a wire nut.

All wires are installed from the breaker box or service panel, to the junction boxes on the first day, no matter what termination device you use.

Yes, the electrician (installer) will finish the installation and move on to the next work site sooner, but not having to get down on his/her knees for every receptacle, will make for a longer career as an electrician, in the long run.

REFERENCE NUMERALS

10. Wire connecting system
14. #14 wire cable
16. #12 wire cable
20. Connector block assembly
22. Front panel
24. Rear panel
26. Vertical column of connector ports
28. A termination device
29. Power receptacle port
30. Neutral receptacle port
32. Neutral ports
34. Power ports
38. Dielectric body
39. Wire gauge indicator
44. Grounding bus
46. Ground screws
64. Front of rear hub
70. Separate termination devices
72. Receptacle
74. Switch
76. Posts that plug into the ports on the front of the Rear hub(64)

REFERENCE NUMERALS

S2. Movable Contacts (screws as one option)
S6a. User control element (Handle shown)
S7. Dielectric body
S8. Power source cable
S9. Ground bus element
S10. Ground screws
S13. Extension points(of parallel connectors) connecting, one switch to another, as a alternative connection method.
S15. Extension points (connects power from one switch to another. Can be used as one of many alternative methods)
S16. Extension points (connects ground from one switch to another. Can be used as one of many alternative methods)
S17 Protective separation Wall
S19. Extension points(connects neutral from one switch to another. Can be used as one of many alternative methods)
S28. Cables going to devices: lights, fans, and the like.

REFERENCE NUMERALS

M1. Wall stud
M2. Clamp, holds the "wire preparation board" to stud
M3. Holder, for Dielectric body or HUB
M4. Electrical tape, to hold, support, and shape wires M5. Multi-gang electrical box
M6. Posts, to make and shape a wiring harness
M7. Height adjustment rod for the wire preparation board
M8. Dielectric body or HUB
M9. Wire preparation board
M10. Approprfate Rolder/hraeket for ROE or EX cables
M11. Sheathed cable wires
M12. Cable sheathing
M13. "REMOVE" sheathing mark
M14. Wiring harness
M15. "cut" cable and wire mark

REFERENCE NUMERALS

M16. Top cover
M18. Receptacles/switches M20. Ground Bar
M21. HUB holder/release snap
M22. A designated wiring area. A trench, being only one of many possible forms.
M23. Cut outs for taping wires on the preparation Board

What is claimed is:

1. An assembly consisting of:
a fixed four sided junction box, and;
a movable top cover, in the open position, for installing and removing terminal devices;
a fully wired dielectric body and a wiring harness is installed In the rough installation process;
an accessible point to view all wires, including the said wiring harness and said dielectric body, fitted into a designated wiring area, of the said junction box;
a said movable top cover, in the closed position, making ready the said junction box for the finishing of the interior walls;
a said movable top cover, utilizing clear and non clear PVC, metal, or any noncombustible material;
wherein said fully wired dielectric body, with said termination device, installed Into said junction box without having to sit on the floor or kneel;
wherein said fully wired dielectric body is held in place by a snap holder;
and wherein said junction box utilizing a terminal device protective paint and dust construction shield.

2. An assembly according to claim 1,
an installation apparatus, having a means to measure and identify locations to cut the wires, and make secure electrical wiring, by way of making said wiring harness connected to said dielectric body; whereby said fully wired dielectric body and said wiring harness is inserted into said junction box;
wherein said dielectric body is electrically connected to said wiring harness, having no exposed electrically charged components, within or outside of said junction box, while all engaged wiring is visible, in a fully assembled application.

* * * * *